US008947536B2

(12) United States Patent
Pahwa et al.

(10) Patent No.: US 8,947,536 B2
(45) Date of Patent: Feb. 3, 2015

(54) AUTOMATIC FAILOVER VIDEO COVERAGE OF DIGITAL VIDEO SENSING AND RECORDING DEVICES

(75) Inventors: Riju Pahwa, Cambridge, MA (US); Kumar Ravi, Cedar Park, TX (US); Radhakrishnan Sethuraman, Austin, TX (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/549,202

(22) Filed: Jul. 13, 2012

(65) Prior Publication Data

US 2014/0015980 A1 Jan. 16, 2014

(51) Int. Cl.
*H04N 7/18* (2006.01)

(52) U.S. Cl.
USPC .......................................... 348/159; 348/143

(58) Field of Classification Search
USPC ............. 348/158, 159, 143, 148, 153, 211.8, 348/218.1, 333.01; 382/103; 700/19
IPC ........................ H04N 7/18,5/232, 5/225, 5/222
See application file for complete search history.

(56) References Cited

U.S. PATENT DOCUMENTS

| | | | | |
|---|---|---|---|---|
| 7,944,470 | B2 | 5/2011 | Foster et al. | |
| 2008/0292140 | A1* | 11/2008 | Morris et al. | 348/143 |
| 2009/0040301 | A1* | 2/2009 | Sandler et al. | 348/143 |
| 2009/0231428 | A1 | 9/2009 | Suzuki | |
| 2011/0149080 | A1 | 6/2011 | Jain et al. | |

OTHER PUBLICATIONS

Bissessar, D. et al., Integrating LPR with CCTV Systems: Problems and Solutions, Proceedings of the SPIE—The Internal Society for Optical Engineering, vol. 8049, (13 pp), 2011.
Anonymous, Advanced Video Management Systems, http://www.ip.com/pubview/IPCOM000191225D; Dec. 22, 2009.
Sony Electronics Inc.; "Edge Storage—Sony and Milestone Collaborate for Video Security", Google.com/Sonyelectronics.com/edgestorage.; 2011.
Brooks Inc.; "Network Video Management System—Customized IP Video Networks"; Google.com/brooks.com/NVMS . . . ; 2010.

* cited by examiner

*Primary Examiner* — Sherrie Hsia
(74) *Attorney, Agent, or Firm* — Lieberman & Brandsdorfer, LLC

(57) ABSTRACT

Failover system for video surveillance. A video coverage area for each camera in the system is calculated by combining sensory information and optical specifications of each corresponding camera. The video coverage area information is embedded in a corresponding file of each camera and is used to autonomously re-orient operating cameras to cover a failed coverage area due to a non-operating camera.

20 Claims, 7 Drawing Sheets

510 Computer
512 Processing Unit$_0$
Bus 514
516 Memory$_0$
518 Functional Unit
540 Information Manager
542 Video Coverage Manager
544 Re-orientation Manager
Detector 570
550
505
500
520 524 508
Camera$_1$
Processing Unit$_1$
Bus 526
Memory$_1$
Sensor 522
552 Optical Specifications 560
530 Camera$_2$ 554
570 Camera$_3$ 556

AUTOMATIC FAILOVER VIDEO COVERAGE OF DIGITAL VIDEO SENSING AND RECORDING DEVICES

BACKGROUND

1. Technical Field

The present invention relates to a method, system, and computer program product for identifying and applying video coverage area information. More specifically, the invention relates to calculating a video coverage area of a camera and compensating for any failed coverage.

2. Description of the Prior Art

The art of digital video surveillance addresses content detection, recognition and analysis of specified areas of examination. Recent improvements in camera technology have allowed for cameras with better image quality, better compression, improved frame rates and improved resolution. Systems now exist where cameras can report these image specifications to a monitoring system, including the relative position and direction of a camera using built in tools.

Despite these innovations, deploying digital video surveillance systems is a laborious and time consuming process. Even after these systems have been installed there still remains uncertainty as to which areas are covered by a camera and which areas are hidden. Furthermore, a non-operative camera can cause an area under surveillance to go unmonitored for an extensive period of time until the issue is both detected and resolved. Therefore, there is a need in the art for accurate video coverage area information from a camera.

SUMMARY OF THE INVENTION

This invention comprises a method, system, and computer program product for the identification and application of one or more areas for video coverage.

In one aspect, a method is provided to identify the video coverage area of a camera. The method includes deriving position data from a camera. This position data includes, but is not limited to, global position coordinates of the camera using a global positioning system, direction of the camera relative to tilt using an accelerometer, and direction of the camera relative to north using a magnetometer of the camera. The method further includes deriving optical specifications of the camera based on the physical limitations. A video coverage area is then calculated using a combination of the derived position data and optical specifications. The calculated video coverage area information is embedded in a corresponding video file of the camera. Accordingly, the provided method enables a camera to contain embedded video coverage area information.

In another aspect, a system is provided to identify video coverage area information for a camera. A processing unit is provided in communication with memory. A functional unit with tools to support the orientation of one or more cameras in communication with the processing unit is further provided in communication with the memory. The tools provided include, but are not limited to, an information manager and a video coverage manager. The information manager derives position information of a camera in the form of global position coordinates based on a global positioning coordinate system. The information manager further derives orientation information of a camera using a magnetometer to find a direction relative to north, and an accelerometer to find a direction relative to tilt. The video coverage manager is in communication with the information manager and calculates a video coverage area for the cameras based on the derived information. The video coverage manager further embeds the calculated video coverage area in a corresponding file.

In an even further aspect, a computer program product is provided for use with a camera. The computer readable program product includes a storage device having computer readable program code embodied therewith. When executed, the computer readable program code derives position data from a camera. The position data includes, but is not limited to, sensory information of the camera in the form of global position coordinates, the direction of the camera relative to north, and the direction of the camera relative to tilt. When executed, the computer readable program code further derives optical specifications based on physical limitations of the camera, and calculates a video coverage area by systematically combining the derived position data and the derived optical specifications. The computer readable program code then embeds the calculated video coverage area information into a corresponding file.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of sensors, detectors, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

A video coverage area, also referred to as a cone of coverage, is the region, as defined by global position system coordinates, that falls within the viewable boundaries of a camera at an instant in time. The video coverage area of a camera may change if the camera is relocated, reoriented, or experiences changes in its optical specifications. A video coverage area is therefore specific to a camera and the position data of the camera.

Figure 1:
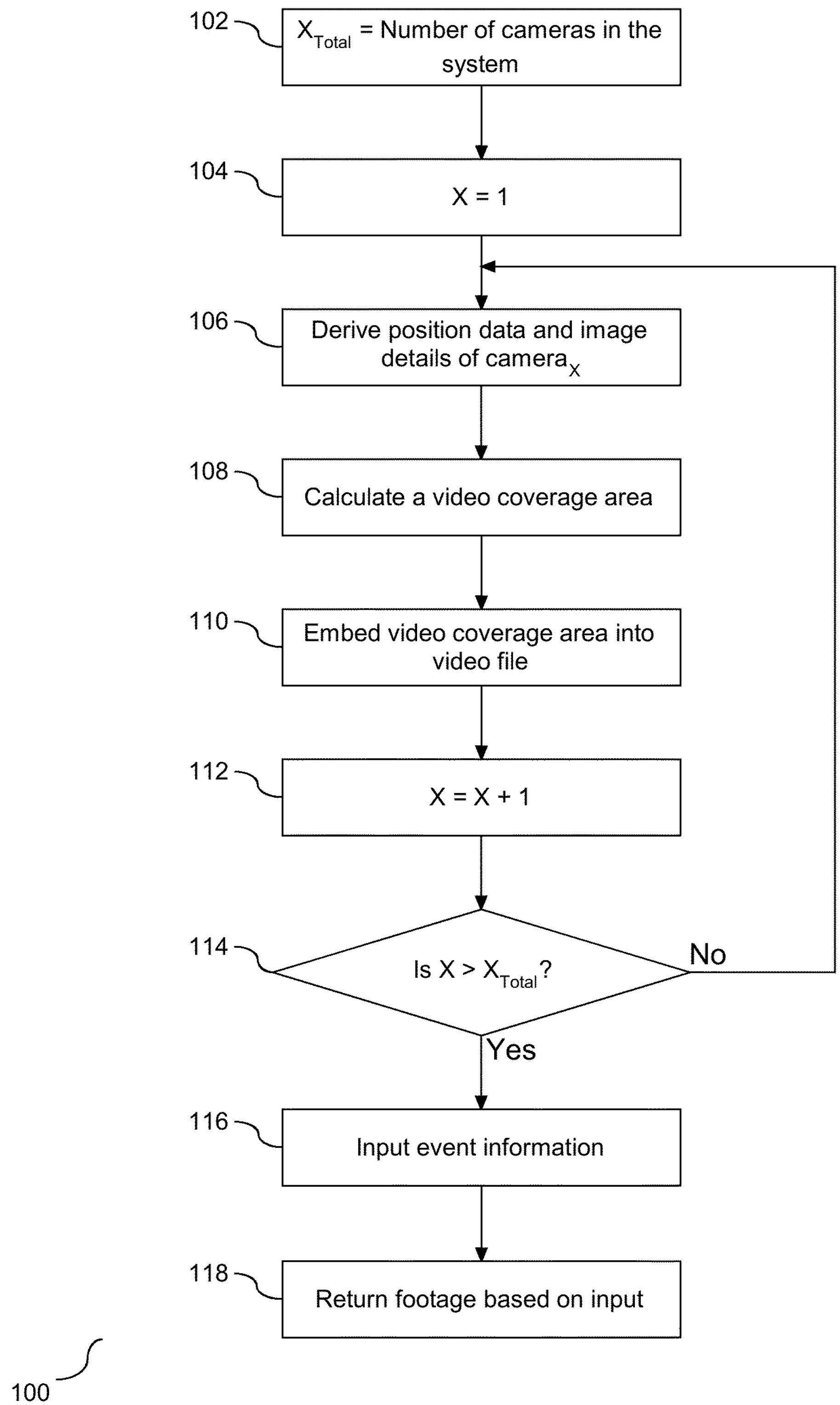
FIG. 1 depicts a flow chart illustrating a process for embedding a video coverage area into a file and returning footage related to video coverage based on input.

FIG. 1 is a flow chart (100) depicting a method for calculating video coverage areas for a system of cameras. Letting $X_{Total}$ represent the number of cameras in the system (102), we set a counting variable x to the integer one (104). Position data as well as optical specifications of the camera, $camera_x$, are derived (106). The derived position data includes but is not limited to, global positioning coordinates, orientation of the camera with respect to North, and orientation with respect to tilt. In one embodiment, the derived optical specifications include but are not limited to, the lens angle, zoom capabilities, sensor size, and lens focal point of the camera. Similarly, in one embodiment, the global position coordinates are obtained from a global positioning coordinate system local to the camera, the orientation is obtained with respect to North from a magnetometer local to the camera, and with respect to tilt from an accelerometer local to the camera.

A video coverage area for the camera is calculated (108) using the derived position data and optical specifications. Once calculated, the video coverage area information is embedded in a corresponding file of the camera (110), such as a video file. In one embodiment, the video coverage area information of the camera is also stored in a data center linked to the camera via a network connection. Following step (110), the value of x is incremented (112). It is then determined if all cameras in the system have been embedded with a corresponding video coverage area (114). If the response to the determination at step (114) is negative, then the response is followed by a return to step (106). In one embodiment, the determination is a comparison of the current value variable x to the value of $X_{Total}$. If the response to the determination at step (114) is positive, than every camera in the system has embedded video coverage area information embedded therewith. Accordingly, each camera in the system contains a calculated video coverage area embedded in a corresponding file.

Using a tool in communication with the camera system, an information request regarding video coverage areas can be inputted (116), returning filtered camera footage with respect to the inputted request (118). In one embodiment, the tool employed at step (116) is a server that supports a time and a location associated with an event to be inputted into the server (116). Having the embedded video coverage area information allows for the server to support a query based upon time and/or location and to return camera footage based upon parameters of input time and/or location (118).

Figure 2:
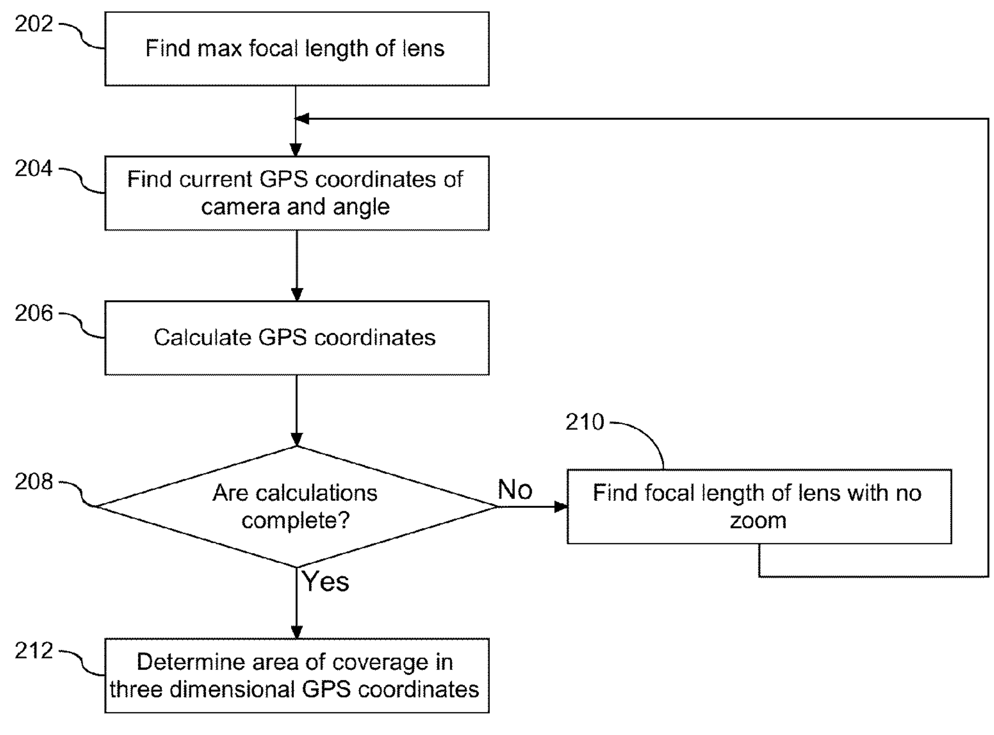
FIG. 2 depicts a flow chart illustrating a process for calculating a video coverage area.

FIG. 2 is a flow chart (200) depicting the video coverage area calculation of step (108) in greater detail. The maximum focal length out of all orientations of the lenses of a camera is determined (202). For a camera that does not support or otherwise provide zoom functionality, the determined focal length is determined from the lens with the maximum focal length. For a camera that does not support or otherwise provide zoom functionality, the maximum focal length is determined to be the focal length of the lens without zoom. The maximum focal length is determined to be the focal length of the lens at which the camera is as zoomed out to the farthest extent possible while still maintaining reasonable image clarity.

The global position coordinates and orientation of the camera based on the maximum focal length of the lens are determined (204). The defining global position coordinate points on a cone base, defined to be the circular cross section of the cone of coverage, are calculated including the global position coordinate point defining the center of the cone of coverage base (206). These coordinate points are calculated using geometrical concepts and theorems based upon the determined focal length involving lateral height and the size of a cone base, combined with physics formulae relevant to geometrical optics.

Following step (206), it is determined if all necessary information has been derived for assessing the maximum video coverage area of the camera (208). In one embodiment, the determination at step (208) includes the focal length as a combination of two lenses in a camera and assessing the global position coordinate data for every lens orientation relevant to calculating the video coverage area of the camera. A negative response to the determination at step (208) leads to the determination of the focal length of the camera lens of the camera not used with or having no zoom functionality (210). The determination of this focal length at step (210) is followed by a return to step (204). However, a positive response to the determination at step (208) is indicative that the global position coordinate points for every lens relevant to calculating the video coverage area of the camera has been determined. Following a positive response to the determination at step (208) the video coverage of the camera is calculated using three dimensional GPS coordinates (212). Accordingly, a video coverage area for the camera is calculated through the determination of relevant global position coordinate data.

Figure 3:
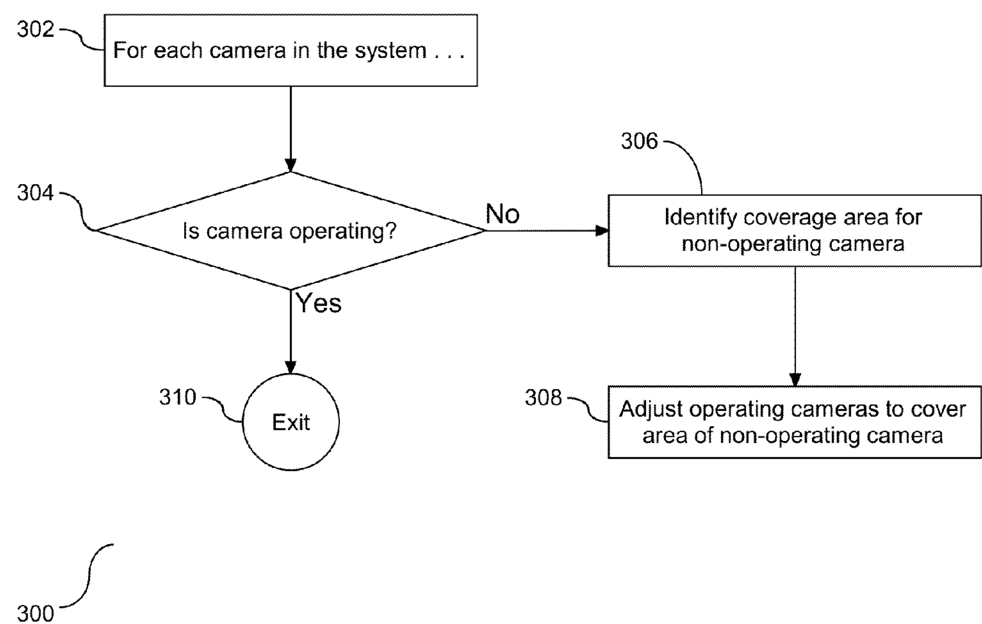
FIG. 3 depicts a flow chart illustrating a process for adjusting cameras to cover an area no longer covered by a non-operational camera.

By having a system of cameras with embedded video coverage areas, an autonomous failover video coverage system can be provided. FIG. 3 is a flowchart (300) for a method of autonomously adjusting operational cameras in a system should one or more cameras in the system fail, e.g. become non-operational. For each camera in the system (302), it is determined if the camera is operational (304). In one embodiment, a camera is autonomously checked for operability through the issuance and detection of a heartbeat, defined to be a periodic signal generated by the camera to ensure the camera is still operating. A negative response to the determination at step (304) leads to identifying the coverage area of the identified non-operating camera (306). One or more operational cameras in the system are adjusted to cover the area of the non-operating camera (308). If all cameras are determined to be operational at step (304), the process concludes (310) without any required camera adjustment for accommodation of a non-operating camera. Accordingly, the system minimizes the time an area under surveillance remains without surveillance coverage by autonomously adjusting operational cameras to cover uncovered areas due to non-operational cameras.

Figure 4A:
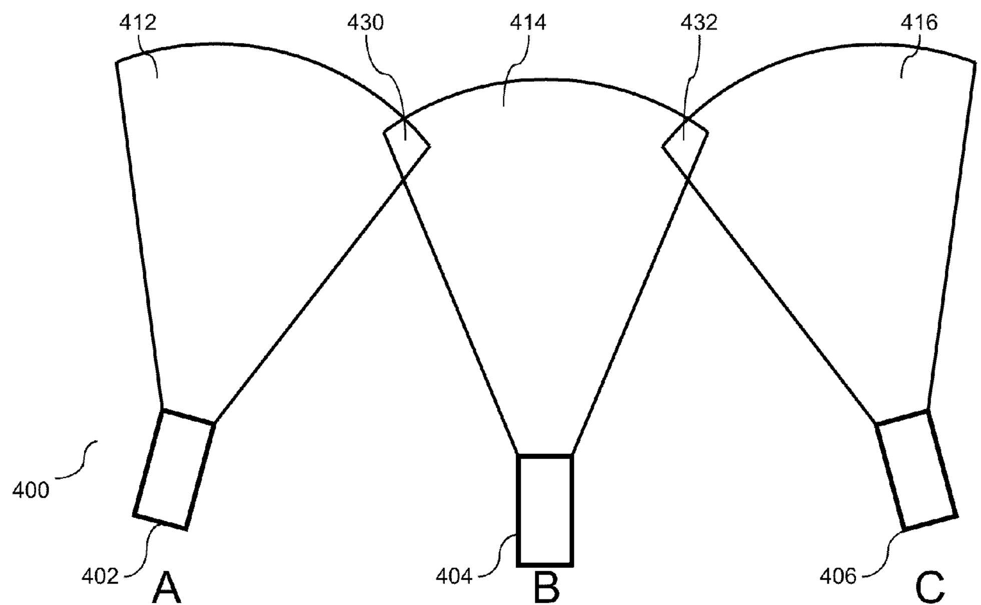
FIGS. 4A and 4B is an illustrative drawing depicting the camera system and process of FIG. 3.
Figure 4B:
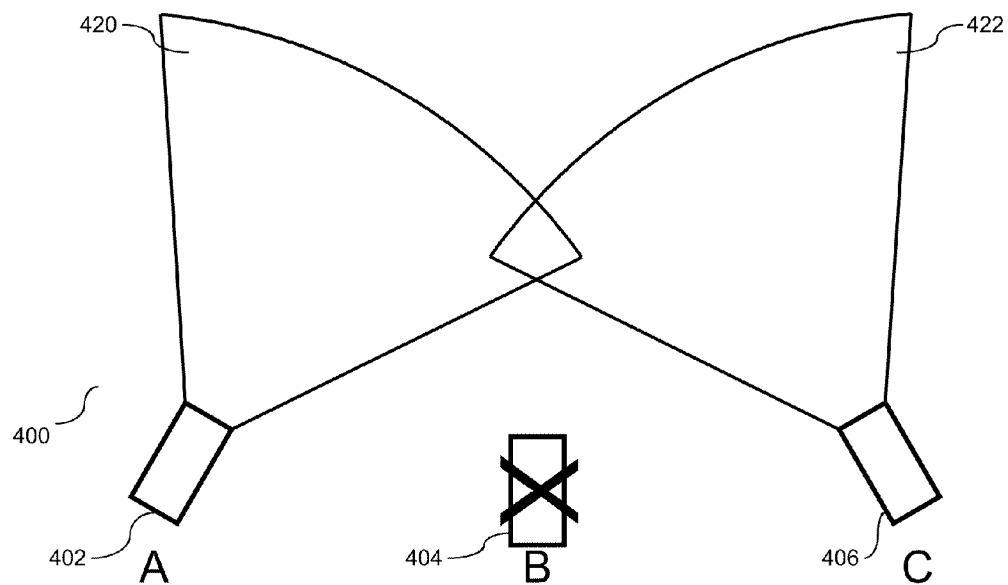

FIGS. 4A and 4B depict an autonomous system of cameras (400). The system is shown with three cameras, including the first camera (402), second camera (404), and third camera (406) each have respective video coverage areas (412), (414), and (416). In one embodiment, the system of cameras may include a larger quantity or smaller quantity of cameras, and as such the illustration with three cameras should not be considered limiting. FIG. 4B depicts the autonomous system of 4A in which the second camera (404) has been recognized as non-operating. The first camera (402) and the third camera (406) are re-oriented in order to each cover new areas (420) and (422), respectively. The new areas covered by the first camera (402) and the third camera (406) contain some area previously covered by the second camera (404) in addition to the coverage of their original coverage areas (412) and (416), respectively, prior to re-orientation. The first and third cameras, (402) and (406), respectively, each cover an additional area previously covered by the second camera (404) such that the combination of coverage area (420) and coverage area (422) contain the entire area (414) previously covered by the second camera (404).

In one embodiment, the video coverage areas (412) and (416) each have some degree of overlap (430) and (432) such that there is some area covered by the first camera (402) that is also covered by the second camera (404), as well as some area covered by the second camera (414) also covered by the third camera (416). Upon re-orientation, the first camera (402) and the third camera (406) maintain the same or near the same size coverage areas, yet manage to cover areas (420) and (422) while still keeping areas (412) and (416) covered by the system by decreasing the degree of overlap between the cameras. For example, in a scenario where the first camera (402) is detected to be non-operative, see step (306), the second camera (404) can re-orient itself to cover an area that overlaps less with the third camera (406) and cover more of the area previously covered by the first camera (402). Even though part of the second camera's original coverage area (414) was lost due to re-orientation, the system of overlapping cameras allows for the third camera (406) to cover the lost coverage area of the second camera (404) while the second camera (404) covers an area lost by the first camera's non-operability. In another embodiment, the first and third cameras (402) and (406) have zoom capabilities such the first and third cameras manage to cover areas (420) and (422) by zooming out, thereby increasing the size of their respective video coverage areas. Accordingly, operating cameras in a system can be autonomously reoriented to cover lost coverage areas due to non-operating cameras, without losing any previous coverage areas.

Figure 5:
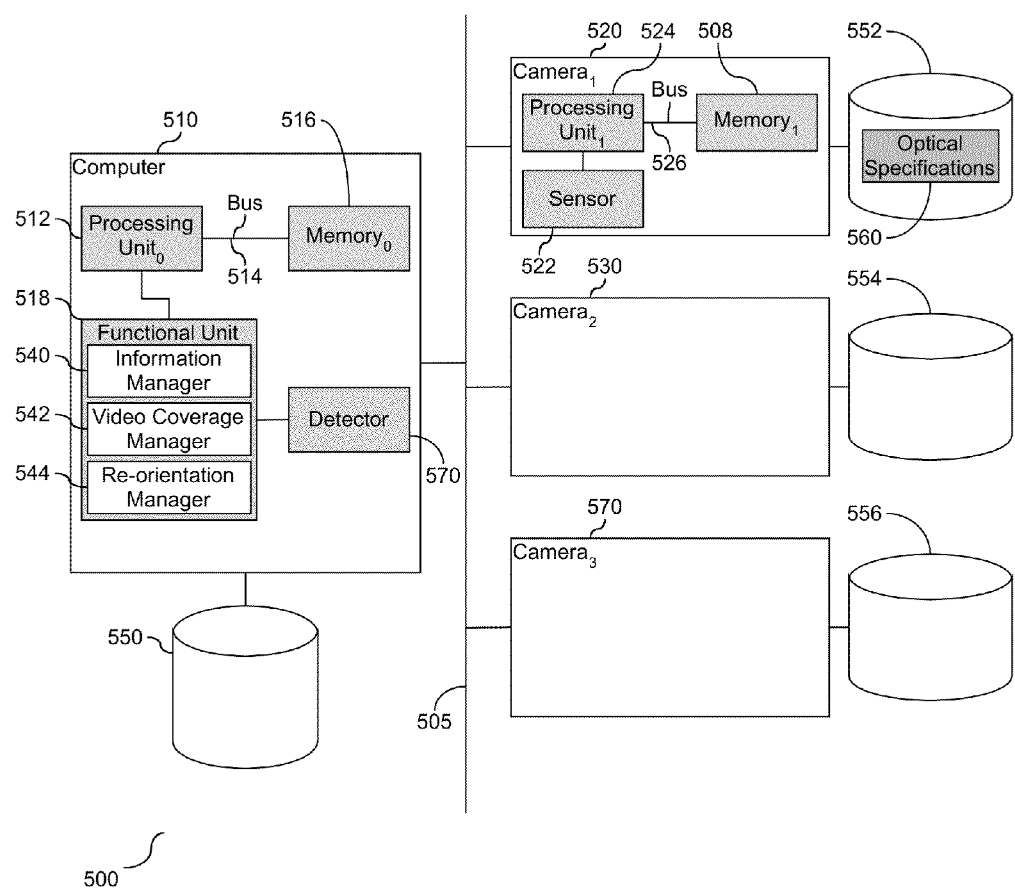
FIG. 5 is a block diagram illustrating tools embedded in a system to support cameras with embedded video coverage area information.

FIG. 5 is a block diagram (500) for a system of cameras having embedded video coverage area information. A computer is provided (510) in communication with data storage (550). The computer (510) is shown having a processing unit (512) in communication with memory (516) across a bus (514). In one embodiment, a functional unit (518) is provided in communication with the processer (512) having tools embedded therewith. The tools may include but are not limited to, an information manager (540) to derive sensory information as described in step (204), a video coverage manager (542) in communication with the information manager to calculate a video coverage area for the cameras in the system by using the derived sensory information as described in step (108), and an orientation manager (544), in communication with a detector (570) to detect a non-operating camera and to orient or re-orient a camera upon detection of a non-operating camera as described in step (308). The computer is in communication with a plurality of cameras (520), (530), and (570), each in communication with a local data storage system (552), (554), and (556), respectively, across a network (505).

A first camera, (520) represents one camera in the system of cameras. The first camera (520) is in communication with data storage (552) containing optical specifications of the camera (560) and has at least one sensor (522) and a processing unit (524) in communication with memory (508) across a bus (526). The sensor (522) detects information relevant to the video coverage area of the camera and may include, but is not limited to, an accelerometer, a magnetometer, and a global positioning coordinate system. The processing unit (524) is in communication with the sensor and combines sensory information derived by the sensor with optical specifications of the camera in order to derive a video coverage area of the camera. In one embodiment of the invention, the processor calculates a new video coverage area for the camera in the event the camera is re-located, re-oriented, or experiences changes in its optical specifications. The video coverage area information is stored in memory (508). In one embodiment, the video coverage area information is stored in the data storage system (550).

Figure 6A:
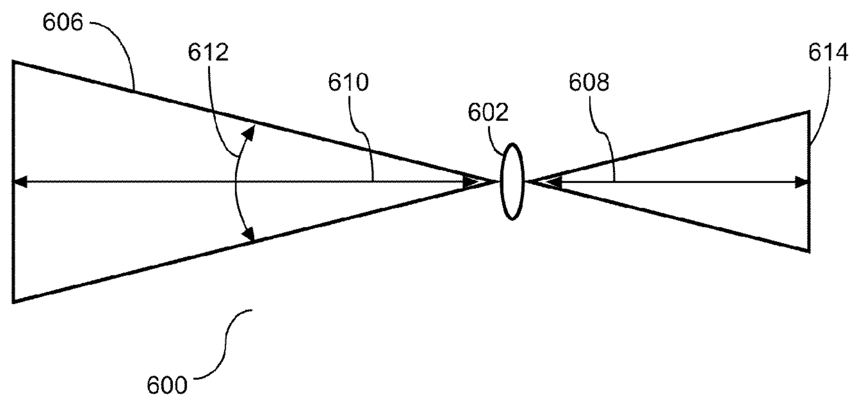
FIGS. 6A and 6B is an illustrative drawing depicting a lens and a camera with projected video coverage areas.
Figure 6B:
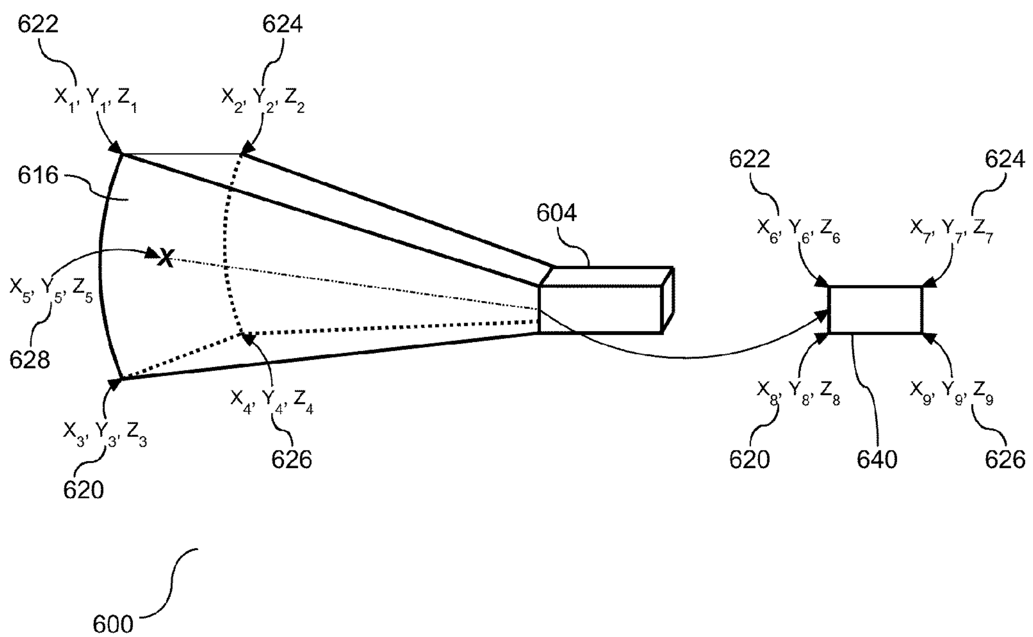

FIGS. 6A and 6B illustrate a system (600) showing a camera lens (602) and a camera (604) projecting a video coverage area (606) and (616). FIG. 6A is shown in two dimensions and shows the optical specifications related to a camera lens (602) and the effect these specifications have on the relative size of a video coverage area (606). According to optics, the focal length (608) of the camera lens determines the distance (610) the camera can perceive objects, e.g. determine the lateral height (610) of the coverage area (606). The angle of view (612) of the camera lens (602) further determines where the video coverage area (606) is located. The sensor (614) detects information relevant to the video coverage area of the camera and may include, but is not limited to, an accelerometer, a magnetometer, and a global positioning coordinate system.

FIG. 6B is a three dimensional diagram (650) showing a camera (604) and a video coverage area having a pyramidal shape (616). It should be noted that although the video coverage area is depicted in this drawing to have a pyramidal shape, the video coverage area is not limited to this shape, and in one embodiment may be conical or an alternative geometrical shape. Global position coordinate boundaries (620, (622), (624), (626) are mapped out to determine the exact video coverage area of the camera as determined in step (206). A sample coordinate number is provided to fall within the boundaries of the video coverage area of the camera (628). In one embodiment, the camera has a visual display, shown herein at (640). The visual display (640) proves a two dimensional representation of the video coverage area. Accordingly, the exact video coverage area of a camera can be determined by mapping out the global position coordinate boundaries of the video coverage area.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
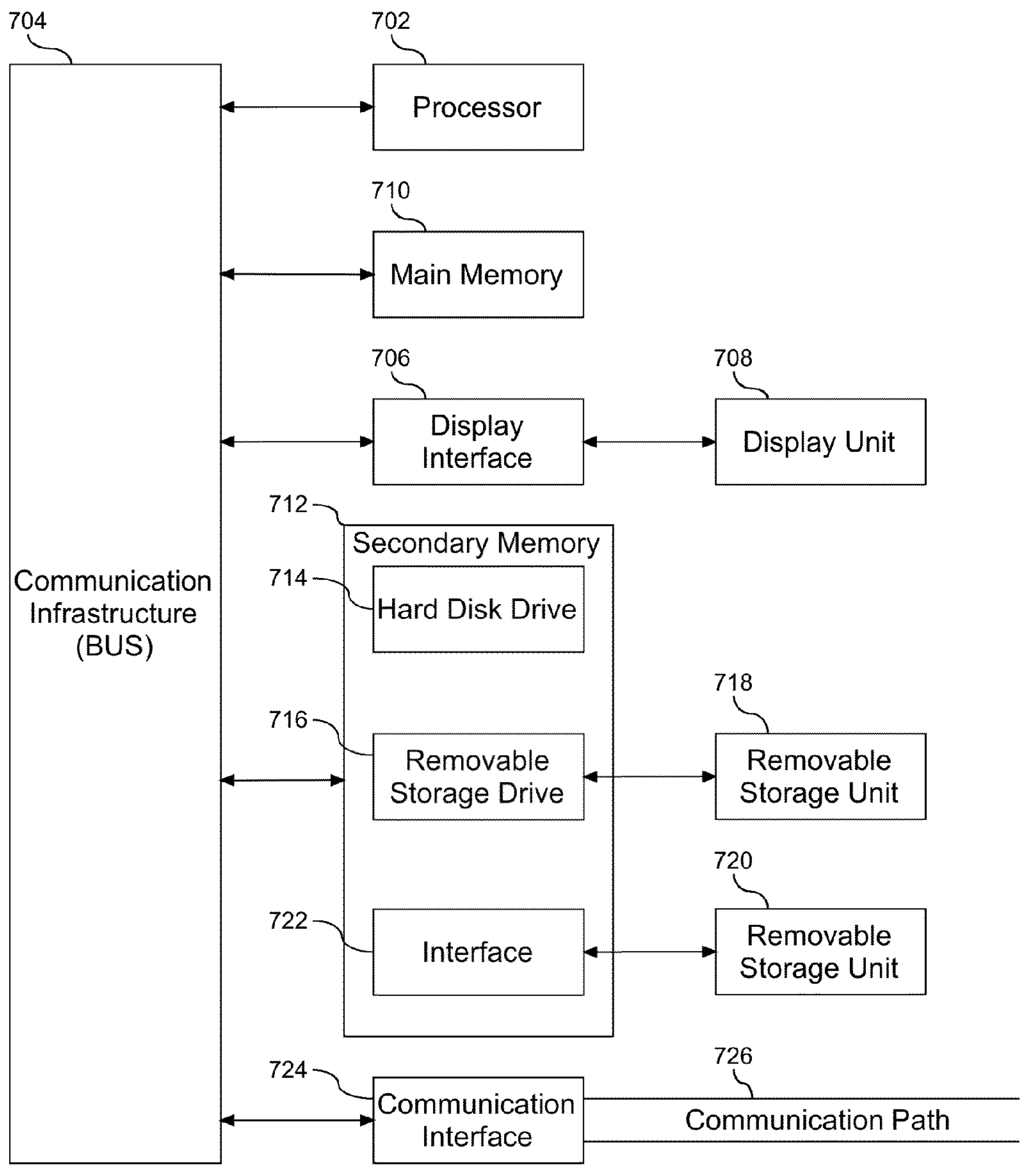
FIG. 7 depicts a block diagram showing a system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) are in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:

deriving position data from a first camera, including:

sensory information of the camera in the form of global position coordinates based on a global positioning system; and orientation of the camera using a magnetometer to find a direction relative to north, and an accelerometer to find a direction relative to tilt;

deriving optical specifications based on physical limitations of the first camera; and calculating a first video coverage area of the first camera, including systematically combining the derived sensory information and the derived optical specifications; and embedding the calculated video coverage area information into a corresponding video file.

2. The method of claim 1, wherein the physical limitations of the first camera are selected from the group consisting of: lens angle, zoom capabilities, sensor size, lens focal point, and any combination thereof.

3. The method of claim 1, further comprising:

a second camera and the first camera comprising a system of cameras receiving event information in the form of an event time and a targeted video coverage area; and returning camera footage from one of the cameras in the system of cameras, wherein the returned footage includes video associated with the event time and targeted video coverage area.

4. The method of claim 1, further comprising:

detecting a state of the first camera, the first camera having an operating and a non-operating state; and responding to detection of the first camera in a non-operating state by using video coverage area information from the derived position data to dynamically adjust a second camera covering a second video coverage area, including automatically adjusting the orientation of the second camera to cover an area of the first video coverage area previously covered by the detected non-operating first camera.

5. The method of claim 4, wherein detecting the state of the first camera includes the first camera emitting a heartbeat to indicate the state of the first camera.

6. The method of claim 4, further comprising a third camera covering a third video coverage area, and the second video coverage area of the second camera and the third video coverage area of the third camera sharing an area of coverage in a first state prior to detection of the first camera in a non-operating state.

7. The method of claim 6, further comprising the second and third cameras responding to the detection of the first camera being in the non-operating state, including the second and third cameras reorienting into a second state of a redistributed shared coverage area, including covering substantially the entire first video coverage area when combining the video coverage area of the second and third cameras.

8. The method of claim 6, wherein the reorientation of the second and third cameras includes enlarging the video coverage area of the second and third cameras.

9. A system comprising:

a processing unit in communication with memory; and a functional unit in communication with the memory, the functional unit including tools to support orientation of one or more cameras in communication with the processing unit, the tools including:

an information manager to derive position data for the one or more cameras, including sensory information of the camera in the form of global position coordinates based on a global positioning system, orientation information of the camera using a magnetometer to find a direction relative to north, and an accelerometer to find a direction relative to tilt; and a video coverage manager in communication with the information manager, the video manager to calculate a video coverage area for the one or more cameras using the information derived by the information manager, and to embed the calculated video coverage area into a corresponding file.

10. The system of claim 9, further comprising:

a detector in communication with the functional unit, the detector to detect a state of a first camera, the first camera having a first video coverage area; and a re-orientation manager in communication with the detector, the re-orientation manager to dynamically adjust a second camera covering a second video coverage area in response to a communication from the detector of the first camera in a non-operating state, including the re-orientation manager to automatically reorient the second camera to cover an area of the first video coverage area previously covered by the detected non-operating first camera.

11. The system of claim 10, further comprising a third camera having a third video coverage area, wherein the second video coverage area of the second camera and the third video coverage area of the third camera share an area of coverage in a first state prior to the detection of the first camera in a non-operating state.

12. The system of claim 11, further comprising the re-orientation manager to reorient the second and third cameras in response to the detection of the first camera being in the non-operating state, including a re-orientation of the second and third cameras into a second state of a re-distributed shared coverage area such that the combined video coverage area of the second and third cameras covers the video coverage area previously covered by the first camera.

13. The system of claim 11, further comprising the re-orientation manager to enlarge the video coverage area of the second and third cameras.

14. A computer program product for use with a camera, the computer program product comprising:

a computer readable storage device having computer readable program code embodied therewith, which when executed causes a computer to:

derive position data from a first camera, including:

sensory information of the camera in the form of global position coordinates; and orientation of the camera to find a direction relative to north, and a direction relative to tilt;

derive optical specifications based on physical limitations of the first camera; and calculate a first video coverage area of the first camera, including systematically combining the derived sensory information and the derived optical specifications; and embed the calculated video coverage area information into a corresponding video file.

15. The computer program product of claim 14, further comprising program code to:

detect a state of the first camera, the first camera having an operating and a non-operating state; and respond to detection of the first camera in a non-operating state by using video coverage area information from the derived position data to dynamically adjust a second camera covering a second video coverage area calculated from derived position data and sensory information, and to automatically adjust the orientation and zoom level of the second camera to cover an area of the first video coverage area previously covered by the detected non-operating first camera.

16. The computer program product of claim 14, further comprising program code to:

detect a state of the first camera, the first camera having an operating and a non-operating state; and respond to detection of the first camera in a non-operating state by using video coverage area information from the derived position data to dynamically adjust a second camera covering a second video coverage area, including the computer program product to automatically adjust the orientation and zoom level of the second camera to cover an area of the first video coverage area previously covered by the detected non-operating first camera.

17. The computer program product of claim 16, wherein the computer program product detects a state of the first camera by emitting a heartbeat to indicate the state of the first camera.

18. The computer program product of claim 16, further comprising program code to adjust a third camera covering a third video coverage area and the second camera covering a second video coverage area such that the second camera and the third camera share an area of coverage in a first state.

19. The computer program product of claim 18, further comprising program code to respond to the detection of the first camera being in the non-operating state, including code to reorient the second and third cameras into a second state of a redistributed coverage area, including the computer program product to combine the video coverage areas of the second and third cameras such that the combination covers the first video coverage area.

20. The computer program product of claim 19, wherein the program code to reorient the second and third cameras into a second state enlarges the video coverage area of the second and third camera.

* * * * *